US012562835B2

(12) United States Patent
    Thubert et al.

(10) Patent No.:    US 12,562,835 B2
(45) Date of Patent:        Feb. 24, 2026

(54) BROADCAST ENERGY AND SPECTRUM CONSUMPTION OPTIMIZATION

(71) Applicant: Cisco Technology, Inc., San Jose, CA (US)

(72) Inventors: Pascal Thubert, Roquefort-les-Pins (FR); J. P. Vasseur, Issy les Moulineaux (FR); Patrick Wetterwald, Mouans Sartoux (FR); Eric Levy-Abegnoli, Valbonne (FR); Jerome Henry, Pittsboro, NC (US)

(73) Assignee: Cisco Technology, Inc.

( * ) Notice: Subject to any disclaimer, the term of this patent is extended or adjusted under 35 U.S.C. 154(b) by 328 days.

(21) Appl. No.: 18/334,054

(22) Filed: Jun. 13, 2023

(65) Prior Publication Data

US 2024/0163005 A1      May 16, 2024

Related U.S. Application Data

(60) Provisional application No. 63/383,295, filed on Nov. 11, 2022, provisional application No. 63/383,180, filed on Nov. 10, 2022.

(51) Int. Cl.
    *H04L 1/00*        (2006.01)
    *H04W 52/34*       (2009.01)
    *H04W 72/54*       (2023.01)
(52) U.S. Cl.
    CPC ........... *H04L 1/0003* (2013.01); *H04W 52/34* (2013.01); *H04W 72/54* (2023.01)
(58) Field of Classification Search
    CPC .... H04L 1/0003; H04L 1/0009; H04W 52/34; H04W 72/54; H04W 4/06

USPC ................................................... 370/329–330
See application file for complete search history.

(56)              References Cited

U.S. PATENT DOCUMENTS

| | | | |
|---|---|---|---|
| 9,402,107 B2 * | 7/2016 | Gonder .............. | H04N 21/6405 |
| 2017/0156112 A1 | 6/2017 | Seok | |
| 2017/0202005 A1 | 7/2017 | Madan et al. | |
| 2017/0230840 A1 | 8/2017 | Chen et al. | |
| 2017/0324571 A1 * | 11/2017 | Bontu ................... | H04L 1/0026 |
| 2018/0184402 A1 | 6/2018 | Cariou et al. | |
| 2020/0163053 A1 | 5/2020 | Xu | |

(Continued)

OTHER PUBLICATIONS

Notification of Transmittal of the International Search Report and the Written Opinion issued in International Patent Application No. PCT/US2023/079418, mailed Feb. 23, 2024 (18 pages).

(Continued)

*Primary Examiner* — Candal Elpenord
(74) *Attorney, Agent, or Firm* — Merchant & Gould P.C.

(57)              ABSTRACT

Broadcast energy and spectrum consumption optimization is provided. A computing device determines a corresponding plurality of respective minimum Modulation and Coding Schemes (MCSs) needed to reach each of a respective plurality of client devices associated with the computing device from the computing device at a predetermined power level. Next, an optimal MCS from the plurality of respective minimum MCSs is used to reach a first group of the plurality of client devices via broadcast. Then unicast is used to reach a second group of the plurality of client devices. The optimal MCS is selected to minimize the total amount of airtime used for the broadcast and the unicast.

20 Claims, 10 Drawing Sheets

(56)　　　　　References Cited

U.S. PATENT DOCUMENTS

| | | |
|---|---|---|
| 2020/0280995 A1 | 9/2020 | Ma et al. |
| 2020/0396019 A1 | 12/2020 | Lumbatis et al. |
| 2022/0029772 A1* | 1/2022 | Wu ........................ H04L 5/0048 |
| 2022/0030519 A1* | 1/2022 | Zhou ..................... H04W 4/021 |
| 2022/0158753 A1* | 5/2022 | Hwang ................... H04W 4/40 |

OTHER PUBLICATIONS

Fuente Iglesias Alejandro et al. "Joint Multicast/Unicast Scheduling with Dynamic Optimization for LTE Multicast Service", European Wireless 2014; 20th European Wireless Conference; May 14, 2014 (May 14, 2014), pp. 462-467, xP093131031, Barcelona, Spain, Retrieved from the Internet: URL:https://ieeexplore.ieee.org/stampPDF. jsp?tp=&arnumber=6843083&tag=1=[retrieved on Feb. 13, 2024] sections II, III-A, B.
Jose F. Monserrat et al.: Joint Delivery of Unicast and E-MBMS Services in LTE Networks, IEEE Transactions On Broadcasting, IEEE Service Center, Piscataway, NJ, US, vol. 58 No. 2, Jun. 1, 2012 (Jun. 1, 2012) pp. 157-167, XP011444600, ISSN: 0018-9316, DOI: 10.1109/TBC.2012.2191030 Figure 6 Section V.

* cited by examiner

200 ⟍

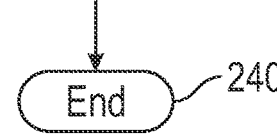

Start    205

210 ⟍

Determine, for each of a plurality of client devices, a corresponding plurality of respective minimum modulation and coding schemes (MCSs) needed to reach each of the respective plurality of client devices from the computing device at a predetermined power level

220 ⟍

Use an optimal MCS from the plurality of respective minimum MCSs to reach a first group of the plurality of client devices via broadcast; and

230 ⟍

Use unicast to reach a second group of the plurality of client devices wherein the optimal MCS is selected to minimize the total amount of airtime used for the broadcast and the unicast End    240

FIG. 2

MCS a: 6 to 10 Predicted Outliers

115

MCS b: 3 Outliers

115

MCS c: 1 to 2 Outliers

115

BROADCAST ENERGY AND SPECTRUM CONSUMPTION OPTIMIZATION

RELATED APPLICATION

Under provisions of 35 U.S.C. § 119(e), Applicant claims the benefit of U.S. Provisional Application No. 63/383,295 filed Nov. 11, 2022, which is incorporated herein by reference. Under provisions of 35 U.S.C. § 119(e), Applicant claims the benefit of U.S. Provisional Application No. 63/383,180 filed Nov. 10, 2022, which is incorporated herein by reference.

TECHNICAL FIELD

The present disclosure relates generally to providing broadcast energy and spectrum consumption optimization.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing broadcast energy and spectrum consumption optimization;

DETAILED DESCRIPTION

Overview

Figure 1:
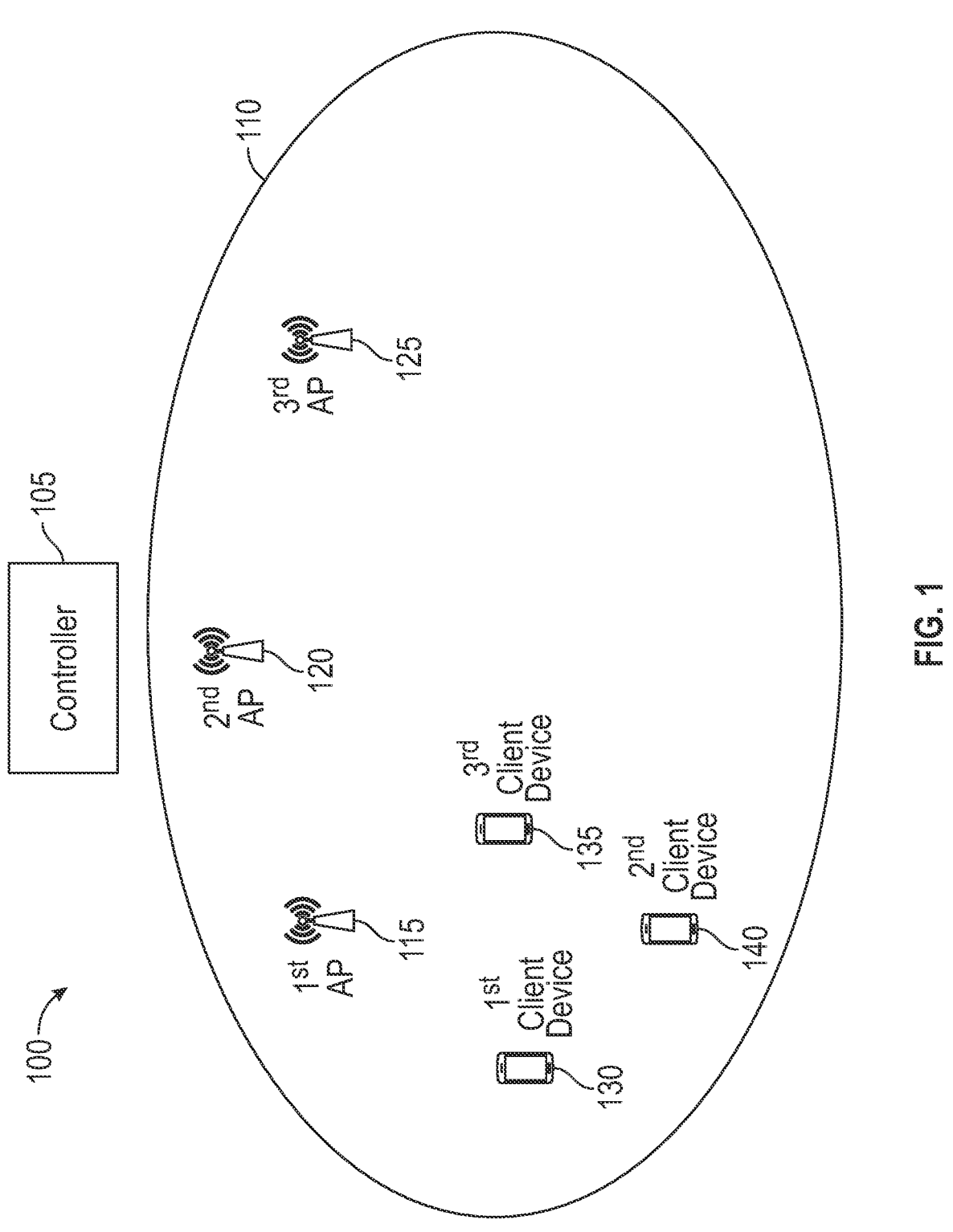
FIG. 1 is a block diagram of an operating environment for providing broadcast energy and spectrum consumption optimization.

Broadcast energy and spectrum consumption optimization may be provided. It may be determined, by a computing device for each of a plurality of client devices, a corresponding plurality of respective minimum Modulation and Coding Schemes (MCSs) needed to reach each of the respective plurality of client devices from the computing device at a predetermined power level. Next, an optimal MCS from the plurality of respective minimum MCSs may be used to reach a first group of the plurality of client devices via broadcast. Then unicast may be used to reach a second group of the plurality of client devices wherein the optimal MCS is selected to minimize the total amount of airtime used for the broadcast and the unicast.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Institute of Electrical and Electronics Engineers (IEEE) 802.1 Ethernet Bridging may provide an efficient and reliable broadcast service for wired networks. Applications and protocols may have been built that heavily depend on that feature for their core operation. Unfortunately, Low-Power Lossy Networks (LLNs) and Wireless Local Area Networks (WLANs) generally may not benefit from the same reliable and cheaper broadcast capabilities as Ethernet links.

As opposed to unicast transmissions, the broadcast transmissions over wireless links may not be subject to Automatic Repeat Request (ARQ) and may be unreliable. To emulate Ethernet broadcast with maximum chances of success to a farthest associated client device (i.e., Station (STA)), an AP may reduce the speed at the physical layer for broadcast transmissions.

This may effectively increase the reliability at the expense of a higher relative cost of broadcast on the overall available bandwidth. As a result, protocols designed for bridged networks that rely on broadcast transmissions may exhibit disappointing behaviors when employed unmodified on a local wireless medium.

In a dense environment with an active roaming behavior (e.g., leveraging Multi-Link Operation (MLO) to locate best APs), the expectation may be that most client devices may associate near their position, and few outliers may stray far. The result may be that the energy and spectrum spent on broadcast serves a few, but may interfere with a great many, beyond the narrow range of near communications for which power and airtime may be reduced.

Accordingly, there may be a need to reduce the amount of bandwidth used for broadcast and lower the power levels for these operations, but this may require predicting which nodes might miss the transmission and handle them separately (e.g., using unicast). However, unicast frames may add overhead, thus sending unicast at low rates to several client devices may cost higher airtime than low rate broadcast. For these far-away client devices, it may be more efficient to use a unicast relay.

FIG. 1 shows an operating environment 100 providing broadcast energy and spectrum consumption optimization. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, and a third AP 125. As described in more detail below, the plurality of APs may comprise any number of APs and is not limited to three. The plurality of APs may provide wireless network access to a plurality of client devices as they move within coverage environment 110.

The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, IEEE 802.11 specification standard for example.

The plurality of APs and the plurality of client devices may use Multi-Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide broadcast energy and spectrum consumption optimization.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

FIG. 2 is a flow chart setting forth the general stages involved in a method 200 consistent with embodiments of the disclosure for providing broadcast energy and spectrum consumption optimization. Method 200 may be implemented using first AP 115 and the plurality of client devices as described in more detail above with respect to FIG. 1. Ways to implement the stages of method 200 will be described in greater detail below.

Method 200 may begin at starting block 205 and proceed to stage 210 where first AP 115 may determine, for each of the plurality of client devices, a corresponding plurality of respective minimum Modulation and Coding Schemes (MCSs) needed to reach each of the respective plurality of client devices from the computing device (e.g., first AP 115) at a predetermined power level. For example, embodiments of the disclosure may leverage analytical techniques to estimate chances to reach most of the plurality of client devices associated with first AP 115 at lower power/faster MCS and predict which outliers may not receive the broadcast, in which case the outlier client device may be ignored, or an alternate process such as beamforming may be used to reach the outlier as a separate unicast. The power levels used by first AP 115 may comprise, but are not limited to, Standard Power (SP), Low Power Indoor (LPI), and Very Low Power (VLP) for example.

The Modulation and Coding Scheme (MCS) index may comprise a list of modulation schemes and coding schemes that may be used to send data to and from wireless devices (e.g., Wi-Fi devices). Modulation schemes may comprise different processes used by each client device and AP to encode data onto a radio signal before transmission. For example, Binary Phase-Shift Keying (BPSK) or Quadrature Phase-Shift Keying (QPSK) may comprise modulation techniques for encoding messages. Some techniques, however, may lead to an increase in errors, and in turn lowering performance. Quadrature Amplitude Modulation (QAM), on the other hand, may use a more complex processes of encoding to maximize throughput speeds and reduce errors. However, QAM may require higher signal strength and Signal-to-Noise Ratio (SNR).

Figure 3A:
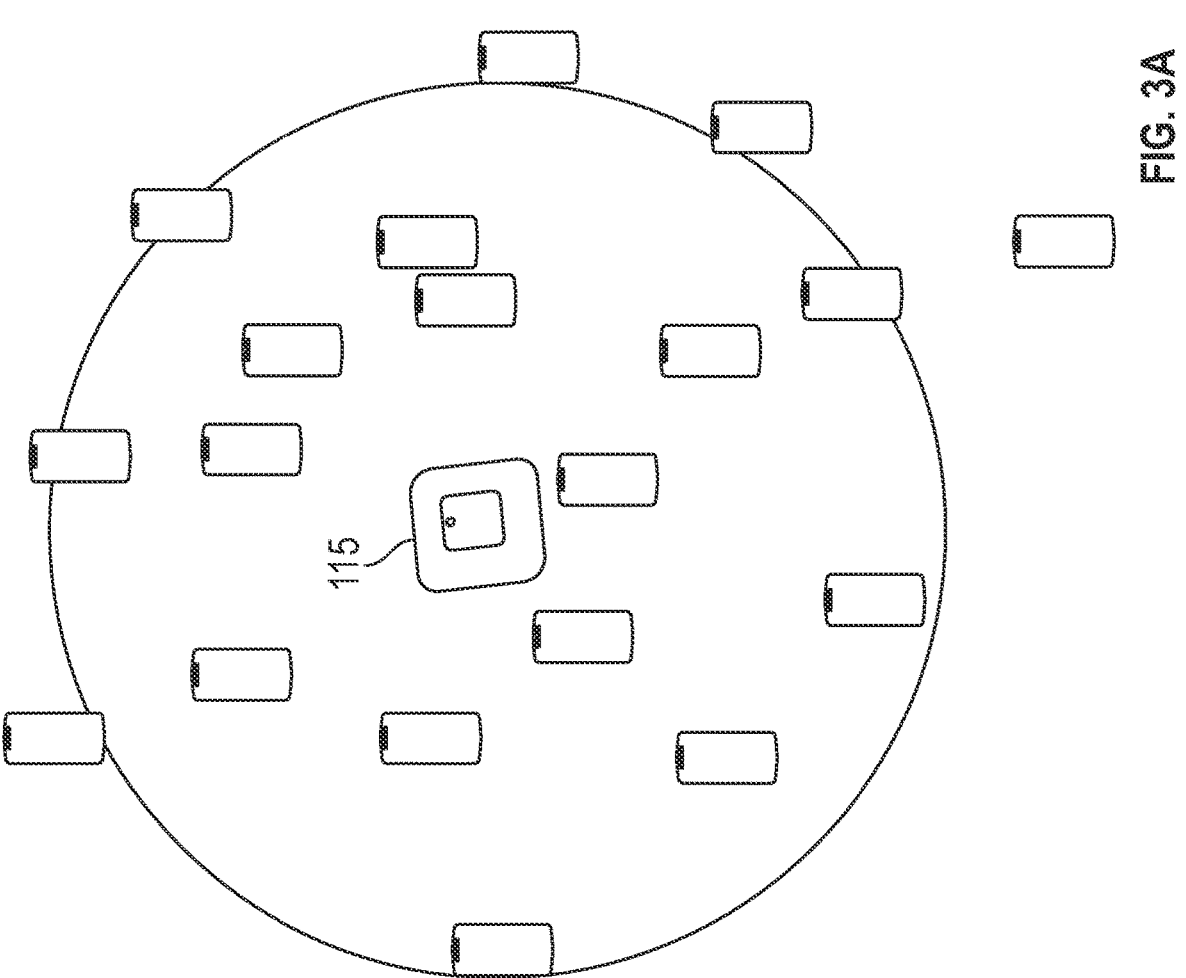
FIGS. 3A, 3B, and 3C illustrate coverage of different MCS indexes.
Figure 3B:
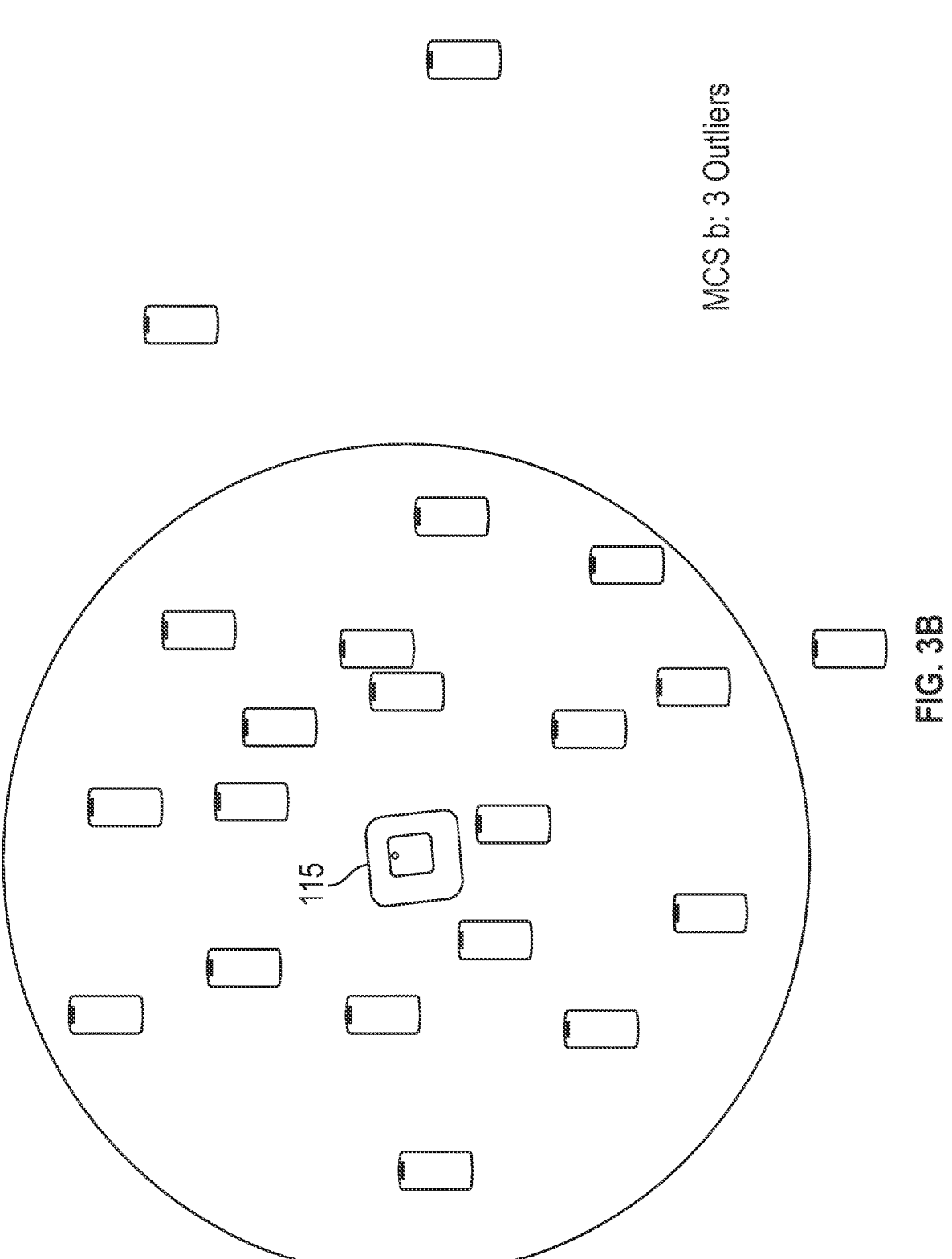
Figure 3C:
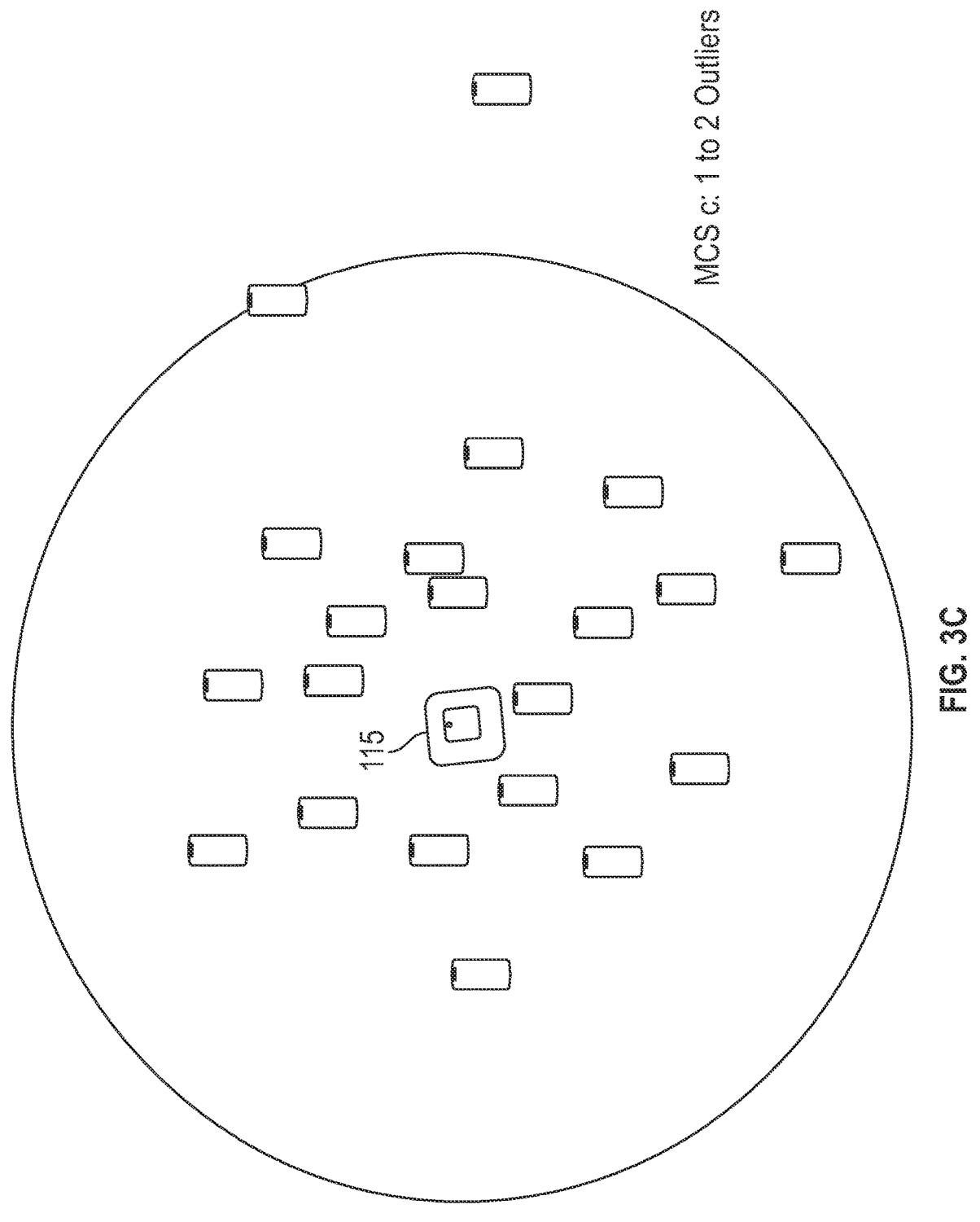

Consider the following example where first AP 115 may predict the outliers that may miss the broadcast for MCS index values of a, b, and c. As illustrated by FIG. 3A, with a first MCS value of a, a Machine Learning (ML)/Artificial Intelligence (AI) engine may predict that many client devices (e.g., 6 to 10) are border line, and the amount of unicast that may be needed to compensate for the broadcast may be too high. As illustrated by FIG. 3B, with a second value b of MCS, the ML/AI engine may indicate that the chances of a miss may be high for three of the plurality of client devices, and low for all others. The ML/AI engine may also indicate that one of the outliers may not need to receive the broadcast. Accordingly, in this example, only two unicast transmissions may be needed. These unicast transmissions may be made using processes such as relays, repeaters, beamforming, or alternate APs with MLO for example. This example of FIG. 3B may comprise an optimum trade off. As illustrated by FIG. 3C, with the third value of MCS, c, there may still be a chance that two outlier client devices may miss the broadcast frame, but the additional airtime may not justify the extra receivers verses the MCS b.

Accordingly, embodiments of the disclosure may predict a short-term chance of success for a transmission to each associated client device using reinforcement learning. The following metrics, for example, may be used to feed the model: i) energy detection at the AP and at the client device;

ii) recent history with MCS settings (Downlink (DL) MCS for unicast traffic to each client device, and success/retry rate); iii) location or distance estimation; and iv) line of sight estimation. In another embodiment, a logistic regression model may be used using the same metrics listed above for the client device, per MSC. The output of the model may be a probability of success rate for a given MCS sending broadcast to a given client device. Embodiments of the disclosure may then select the MCS that the model outputs the highest probability.

From stage 210, where first AP 115 determines, for each of the plurality of client devices, the corresponding plurality of respective minimum MCSs needed to reach each of the respective plurality of client devices from the computing device (e.g., first AP 115) at the predetermined power level, method 200 may advance to stage 220 where first AP 115 may use an optimal MCS from the plurality of respective minimum MCSs to reach a first group of the plurality of client devices via broadcast. For example, embodiments of the disclosure may select an optimal MCS for broadcast transmissions that consumes the lowest amount of airtime, for which there may be few to no outliers and performs the broadcast at that MCS.

Once first AP 115 uses the optimal MCS from the plurality of respective minimum MCSs to reach the first group of the plurality of client devices via broadcast in stage 220, method 200 may continue to stage 230 where first AP 115 may use unicast to reach a second group of the plurality of client devices. The optimal MCS may be selected to minimize the total amount of airtime used for the broadcast and the unicast. For example, embodiments of the disclosure may apply a corrective measure to ensure that the outlier client devices that may require the broadcast to receive it. Logic such as Application Visibility and Control (AVC), Neighbor Discovery (ND), or Multicast Domain Name Service (mDNS) proxies may determine that some or all of the outlier client devices may not need the broadcast (e.g., it is not a target, outlier may deal without this specific broadcast instance, often a periodic message or does not provide the service for a lookup), in which case the outlier client device may not be considered. If it is not determined that the outlier client device may ignore the broadcast, then a process that produces less interference such as beamforming, for example, may be used for unicast transmission to the outlier. Moreover, a relay client device within the plurality of client devices may be used to perform the unicast as described in greater detail below.

The MCS may be re-evaluated to use for broadcast according to a number of criteria. Wireless topologies may change and upon detecting a topology change (e.g., controller 105 may have access to the topology), embodiments of the disclosure may trigger an MCS re-evaluation process as described above. In another embodiment, the system may trigger another MCS evaluation process if it detects that the acknowledgment rates for unicast frames decreases and the AP has to rate shift (up or down), which may mean that the environment has changed and some client device may no longer receive broadcast with the current MCS, or that a higher MCS may be possible. Embodiments of the disclosure may allow broadcasts at non-basic rates, along with a messaging structure to the unicast client devices to inform them that they may skip the Delivery Traffic Indication Message (DTIM) and may receive broadcasts over unicast. Once first AP 115 uses unicast to reach the second group of the plurality of client devices in stage 230, method 200 may then end at stage 240.

Broadcast Relay Optimization

Figure 4A:
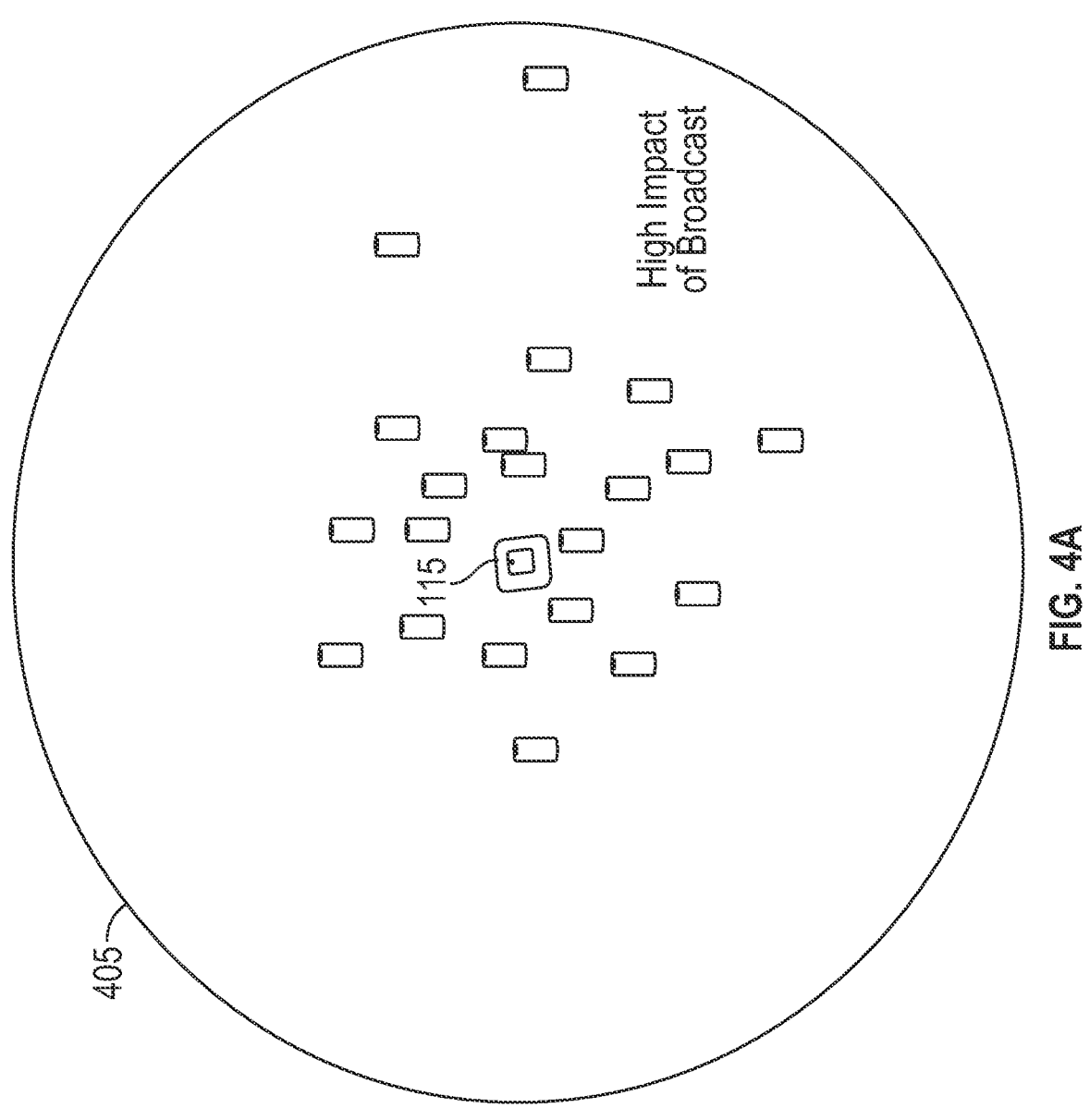
FIGS. 4A, 4B, 4C, and 4D illustrate coverage of a relay device.
Figure 4B:
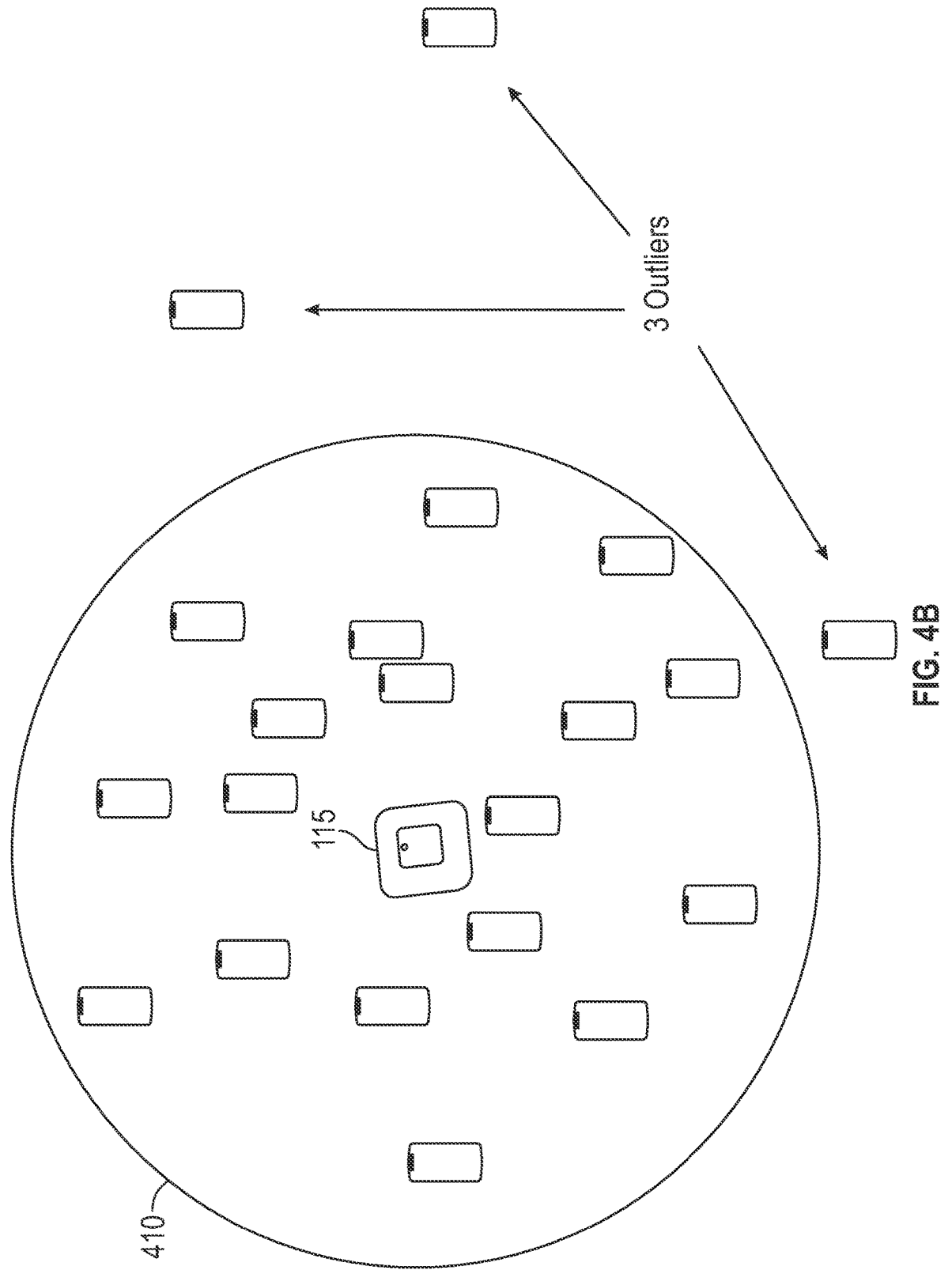

As stated above, a relay client device within the plurality of client devices may be used to perform the unicast. As illustrated by FIG. 4A, the amount of energy that may be necessary to broadcast a frame to all associated client devices (e.g., illustrated by a surface 405) augments roughly with the square of the distance of the farthest client device, and the zone of interference may augment faster than that. For example, first AP 115 may lower its power to the minimum possible for a broadcast frame. There may be a benefit in terms of spectrum utilization, in terms of airtime (e.g., if the frame is sent at higher than the minimum basic rate), and interference (e.g., when the transmitted power is reduced as illustrated by a surface 410 as shown in FIG. 4B)). Also, AP power requirements may be reduced. On the other hand, as illustrated by FIG. 4B, there may be a chance that one or more of the outlier client devices may not receive the broadcast because it may be too far away from first AP 115 or it may be interfered with.

Figure 4C:
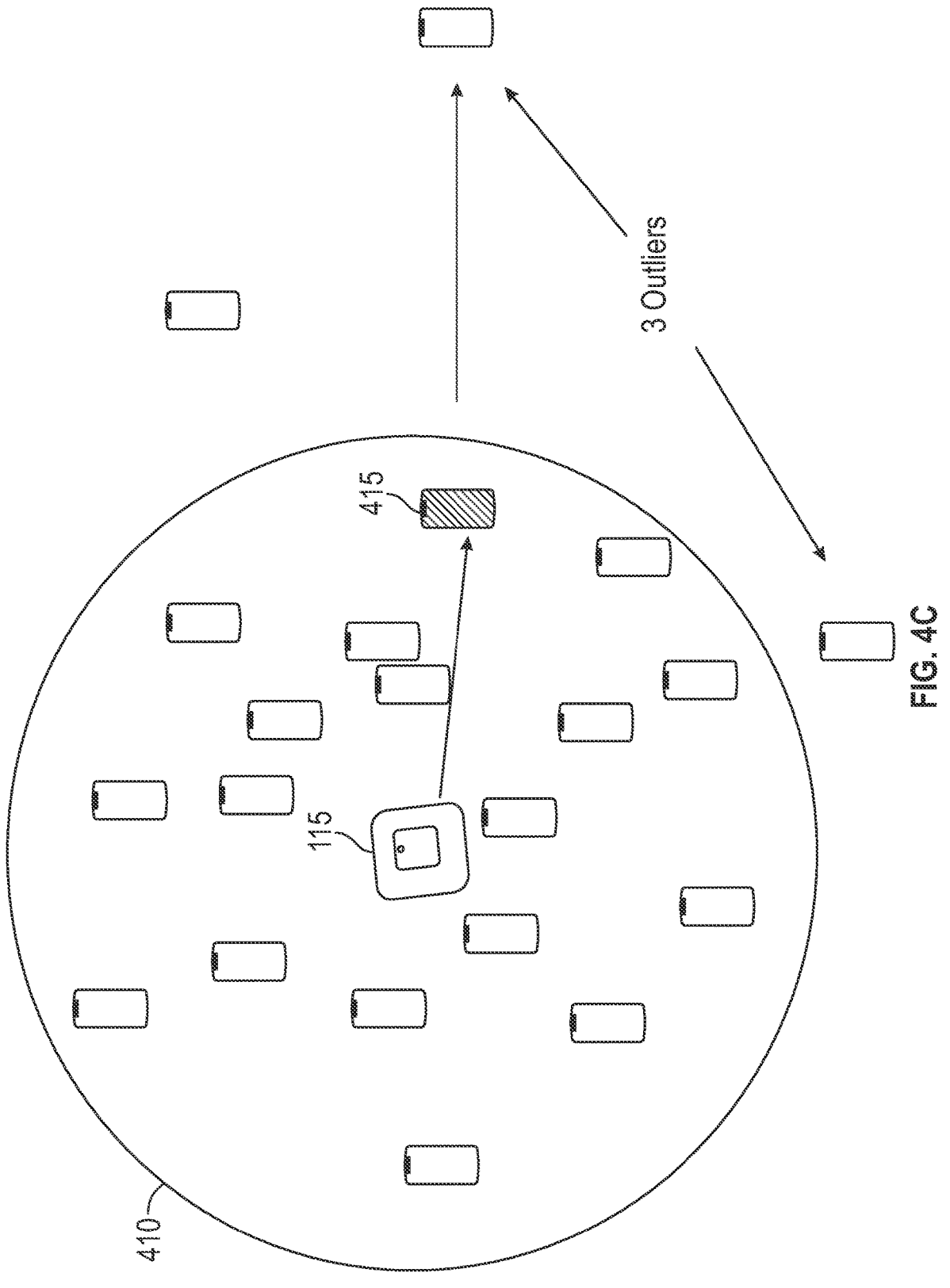

Accordingly, there may be a need to deliver the broadcast to the outliers, though not at the cost of a long distance/poor MCS that may cost as much spectrum as (or more than) the original broadcast would. Consequently, as illustrated by FIG. 4C, embodiments of the disclosure may unicast the message to each outlier client device one by one using a relay client device 415 to save power and/or augment the PHY rate. An ML/AI engine may be used to select a best relay client device from the plurality of client devices and their parameters. An augmentation of 802.11 may extend the relay function from the Sub 1 GHz (S1G) ban to the main standard and qualify the relay function for this usage.

Consistent with embodiments of the disclosure, at association time, the plurality of client devices may signal their willingness to operate as relays. The relay function may be specific and/or qualified (e.g. broadcast only or upon conditions). First AP 115 may have collected Key Performance Indicators (KPIs) from the plurality of client devices and may determine the likely broadcast coverage area and the likely outliers. First AP 115 may examine each outlier, each potential relay, and may determine the probability for each potential relay to reach each likely outlier. This may comprise a short term prediction based on multiple elements that may allow first AP 115 to increase the precision of each prediction. As such first AP 115 may only consume the elements necessary to reach a satisfactory probability level.

The aforementioned prediction may consider the potential relay and target client device collision rate. For example, client devices on different sides of first AP 115 may have a larger chance of a hidden node/collision issue. This may be surfaced with one of the two sending a frame with the retry bit set right after the other one's transmission completes. This prediction may also consider relay-to-client device sounding tests (e.g., the relay may be requested by first AP 115 to sound to the target client device). Furthermore, when available, ranging tests may be used. For example, upon request from first AP 115, the relay may share its timers when observing a Fine Time Measurement (FTM) exchange between the client devices and first AP 115 (or another AP). Similarly, observed sounding tests may be used. For example, upon request from first AP 115, the potential relay may share its timers when observing a sounding exchange between the AP and the target client device. Based on these aforementioned elements, first AP 115 may predict which potential relay may be most likely to reach the target outlier client device, and what may be the power budgets involved (e.g., AP to relay and relay to client device).

The choice of a relay may also depend on a number of additional operational metrics. The additional operational metrics may include the available power to the relay (e.g., is it battery powered, how much power/left-battery does it have, is it in a power-saving mode, etc.). Device analytics may provide information about the device power source and levels. The additional operational metrics may also include how much energy and time has been used from this potential relay in the past. Furthermore, the additional operational metrics may include the potential relay's reported wireless neighbors and conditions (e.g., is it close in terms of Received Signal Strength Indicator (RSSI), FTM, etc., to the outlier client devices. Moreover, the additional operational metrics may include the predicted radius (and hence power) it may need to cover the outliers and feedback from past runs (e.g., how successful the previous relayed broadcasts from same relay node have been).

Figure 4D:
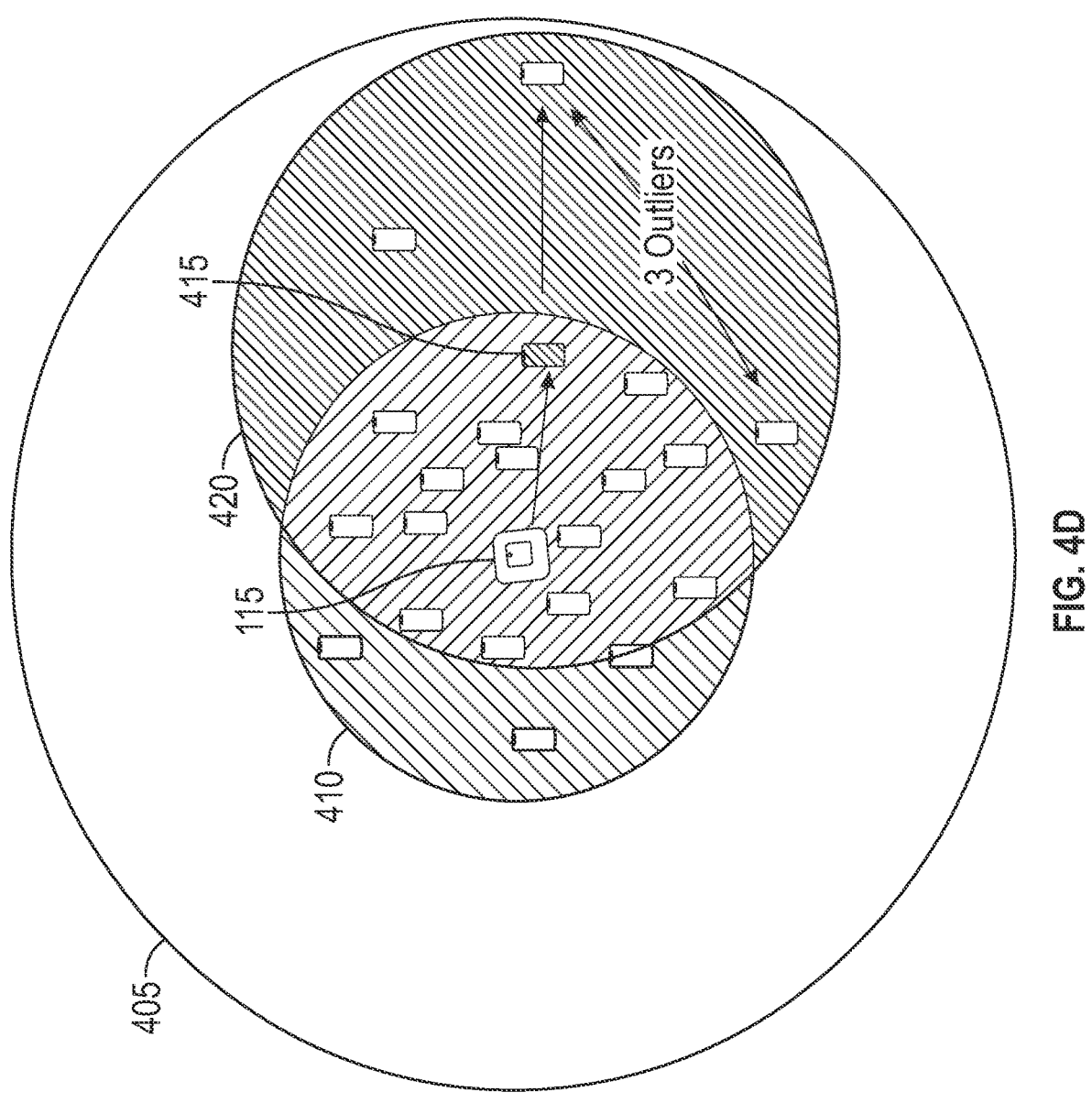

First AP 115 may select a best relay (e.g., that may minimize the power, airtime consumption, and the other constraints listed above), and instructs the relay (e.g., relay client device 415) to forward individual broadcast frames to the target client device. FIG. 4D illustrates that the sum of surface 410 and a surface 420 (e.g., representing the energy spent) may be less than the initial surface 405 for the all-encompassing broadcast. Another dimension may comprise the number of relays. In a sparse placement of outliers, it may be less preferable to have a single relay (e.g., with a big radius and hence energy and collision domain), rather than multiple ones with small radius and the inherent advantages of this.

Figure 5:
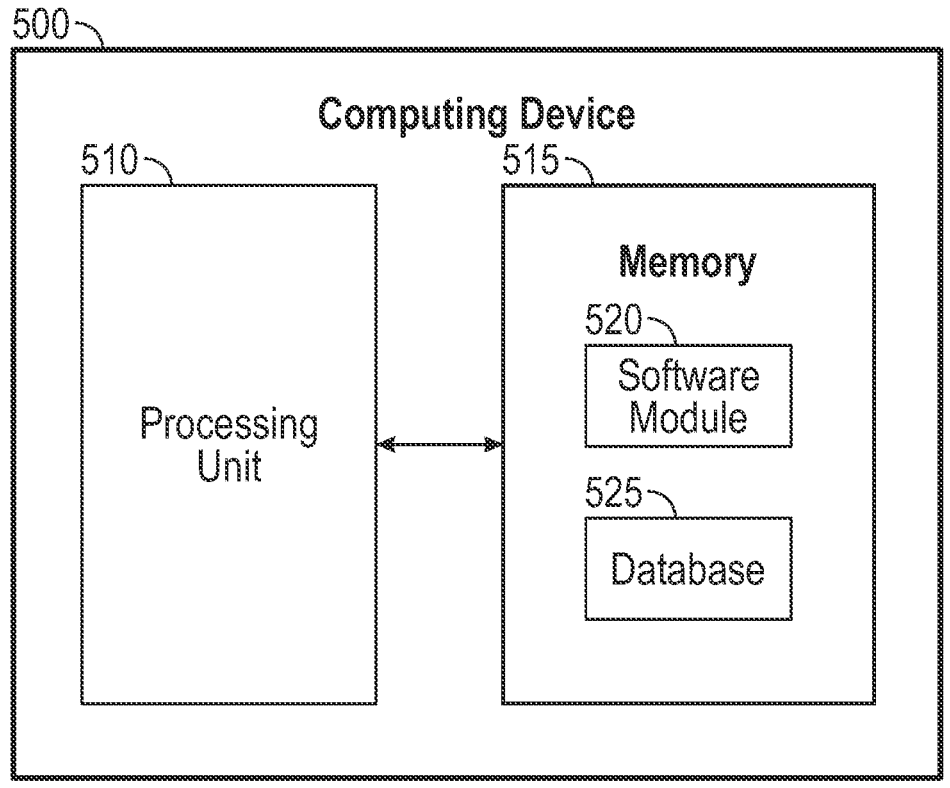
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing broadcast energy and spectrum consumption optimization as described above with respect to FIG. 2. Computing device 500, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
determining, by a computing device for each of a plurality of client devices associated with the computing device, a corresponding plurality of respective minimum Modulation and Coding Schemes (MCSs) needed to reach each of the respective plurality of client devices from the computing device at a predetermined power level;
using an optimal MCS from the plurality of respective minimum MCSs to reach a first group of the plurality of client devices via broadcast;
determining that at least one of the plurality of client devices not in the first group of the plurality of client devices does not need to be reached;
determining a second group of the plurality of client devices not in the first group of the plurality of client devices and not comprising the at least one of the plurality of client devices that does not need to be reached; and
using unicast to reach the second group of the plurality of client devices, wherein the optimal MCS is selected to minimize a total amount of airtime used for the broadcast and the unicast to each client device of the second group of the plurality of client devices.

2. The method of claim 1, wherein using unicast to reach the second group comprises using a process that minimizes interference.

3. The method of claim 2, wherein using the process that minimizes interference comprising using beamforming.

4. The method of claim 2, wherein using the process that minimizes interference comprises using a relay client device.

5. The method of claim 1, wherein the predetermined power level comprises a Low Power Indoor (LPI) level.

6. The method of claim 1, wherein the computing device comprises an Access Point (AP).

7. The method of claim 1, further comprising:
informing the second group of the plurality of client devices that they may skip the Delivery Traffic Indication Message (DTIM).

8. The method of claim 1, wherein determining that the at least one of the plurality of client devices not in the first group of the plurality of client devices does not need to be reached comprises determining that the at least one of the plurality of client devices not in the first group of the plurality of client devices is not a target if the broadcast.

9. The method of claim 1, further comprising:
determining a topology change or a decrease in an acknowledgment rate for unicast frames; and
re-determining, for each of the plurality of client devices, the corresponding plurality of respective minimum MCSs needed to reach each of the respective plurality of client devices from the computing device at the predetermined power level.

10. A system comprising:
a memory storage; and
a processing unit disposed in a computing device coupled to the memory storage, wherein the processing unit is operative to:
determine, for each of a plurality of client devices, a corresponding plurality of respective minimum Modulation and Coding Schemes (MCSs) needed to reach each of the respective plurality of client devices from the computing device at a predetermined power level;
use an optimal MCS from the plurality of respective minimum MCSs to reach a first group of the plurality of client devices via broadcast;
determine that at least one of the plurality of client devices not in the first group of the plurality of client devices does not need to be reached;
determine a second group of the plurality of client devices not in the first group of the plurality of client devices and not comprising the at least one of the plurality of client devices that does not need to be reached; and
use unicast to reach the second group of the plurality of client devices wherein the optimal MCS is selected to minimize a total amount of airtime used for the broadcast and the unicast to each client device of the second group of the plurality of client devices.

11. The system of claim 10, wherein the processing unit being operative to use unicast to reach the second group comprises the processing unit being operative to use a process that minimizes interference.

12. The system of claim 11, wherein the processing unit being operative to use the process that minimizes interference comprising the processing unit being operative to use beamforming.

13. The system of claim 11, wherein the processing unit being operative to use the process that minimizes interference comprises the processing unit being operative to use a relay client device.

14. The system of claim 10, wherein the predetermined power level comprises a Low Power Indoor (LPI) level.

15. A non-transitory computer-readable medium that stores a set of instructions which when executed perform a method executed by the set of instructions comprising:
determining, by a computing device for each of a plurality of client devices, a corresponding plurality of respective minimum Modulation and Coding Schemes (MCSs) needed to reach each of the respective plurality of client devices from the computing device at a predetermined power level;
using an optimal MCS from the plurality of respective minimum MCSs to reach a first group of the plurality of client devices via broadcast; and
determining that at least one of the plurality of client devices not in the first group of the plurality of client devices does not need to be reached;

determining a second group of the plurality of client devices not in the first group of the plurality of client devices and not comprising the at least one of the plurality of client devices that does not need to be reached;

using unicast to reach the second group of the plurality of client devices wherein the optimal MCS is selected to minimize a total amount of airtime used for the broadcast and the unicast to each client device of the second group of the plurality of client devices.

16. The non-transitory computer-readable medium of claim 15, wherein using unicast to reach the second group comprises using a process that minimizes interference.

17. The non-transitory computer-readable medium of claim 16, wherein using the process that minimizes interference comprising using beamforming.

18. The non-transitory computer-readable medium of claim 16, wherein using the process that minimizes interference comprises using a relay client device.

19. The non-transitory computer-readable medium of claim 15, wherein the predetermined power level comprises a Low Power Indoor (LPI) level.

20. The non-transitory computer-readable medium of claim 15, wherein the computing device comprises an Access Point (AP).

* * * * *